United States Patent [19] [11] 3,876,795
Cracco et al. [45] Apr. 8, 1975

[54] METHOD OF KILLING ACARIDS USING BIS(TRI-N-HEXYLTIN)OXIDE

[75] Inventors: Francis Jean Cracco; Wayne Irwin Fanta, both of Cincinnati, Ohio

[73] Assignee: The Procter and Gamble Company, Cincinnati, Ohio

[22] Filed: Aug. 2, 1973

[21] Appl. No.: 385,129

Related U.S. Application Data

[63] Continuation-in-part of Ser. No. 283,897, Aug. 25, 1972, abandoned.

[52] U.S. Cl. .............................................. 424/288
[51] Int. Cl. ................................................ A01n 9/24
[58] Field of Search .................................... 426/288

[56] References Cited
UNITED STATES PATENTS

| 3,031,483 | 4/1962 | Koopmans | 424/288 |
| 3,222,158 | 12/1965 | Sowa | 424/288 X |
| 3,248,283 | 4/1966 | Loitjen | 424/288 |
| 3,264,177 | 8/1966 | Kanaga | 424/288 |
| 3,268,395 | 8/1966 | Taylor | 424/288 |
| 3,417,117 | 12/1968 | Davies | 260/429.7 |
| 3,702,360 | 11/1972 | Graham | 424/288 |

OTHER PUBLICATIONS
Blum et al., J. Econ. Ent., 53:445–8, (1960).

*Primary Examiner*—Albert T. Meyers
*Assistant Examiner*—Leonard Schenkman
*Attorney, Agent, or Firm*—Richard C. Witte; Julius P. Filcik; Monte D. Witte

[57] ABSTRACT

An acaricidal method having low toxicity to plants, comprising the contacting of plants, which are infested or are subject to the infestation by acarids, with an acaricidally effective amount of bis(tri-acyclicalkyltin)oxide wherein the alkyl groups contain from 5 to 7 carbon atoms, or with an adduct of bis(tri-alkyltin)oxide, wherein the alkyl groups contain from 5 to 7 carbon atoms, formed by reaction with $CO_2$, $CS_2$, or $SO_2$.

2 Claims, No Drawings

METHOD OF KILLING ACARIDS USING BIS(TRI-N-HEXYLTIN)OXIDE

CROSS-REFERENCE TO RELATED APPLICATION

This application is a continuation-in-part of application Ser. No. 283,897 filed Aug. 25, 1972, now abandoned.

BACKGROUND OF THE INVENTION

The present invention relates to the killing of organisms belonging to the class acarina, which includes mites and ticks.

Acarids are a serious problem in agriculture and horiculture. These organisms are widely distributed throughout the world and in the United States they are known to attack a wide variety of horicultural and agricultural plants, as well as poultry and livestock.

The bis(trialkyltin)oxides are known to be toxic to insects, acarids, bacteria and other pest organisms. The species of bis(trialkyltin)oxide given widest mention in the literature with respect to pesticidal use is bis(tri-n-butyltin)oxide (TBTO), since this species has apparently been determined to be about optimum with respect to pesticidal activity. TBTO, however, while being an excellent pesticide, has not found wide use in combating pests on agricultural crops, ornamentals or other beneficial plants because it is highly phytotoxic to plants. U.S. Pat. No. 3,264,177 discloses that various compounds containing specifically a tricyclohexyltin group, including bis(tricyclohexyltin)oxide, are useful in killing arachnids on plants. Bis(triphenyltin)oxide is described as a fungicide useful on plants in U.S. Pat. No. 3,248,283.

The adducts of bis(trialkyltin)oxides and compounds such as $CO_2$, $CS_2$, and $SO_2$ are described in the literature as being useful in fungicidal preparations.

SUMMARY OF THE INVENTION

It is an object of this invention to provide a novel method of combating infestations of acarina on plants.

It is a further object of this invention to provide a novel method of preventing the infestation of healthy plants by acarina.

The present invention provides an acaricidal method comprising the contacting of plants which are infested or which are subject to infestation by acarina with an acaricidally effective amount of a compound selected from the group consisting of bis(tri-acyclicalkyltin)oxides, adducts of bis(trialkyltin)oxides with $CO_2$, $CS_2$, or $SO_2$, and mixtures thereof. The alkyl group consists of five to seven carbon atoms.

DESCRIPTION OF THE INVENTION

It has now been found according to the present invention that the bis(triacyclicalkyltin)oxides and adducts of bis(trialkyltin)oxides with $CO_2$, $CS_2$, and $SO_2$, wherein the alkyl groups contain from 5 to 7 carbon atoms, have acaricidal activity substantially equivalent to that of TBTO, and at the same time have low phytotoxicity to plants. Accordingly, the present invention provides an acaricidal method comprising the contacting of plants which are infested or which are subject to infestation by acarina with an acaricidally effective amount of an organotin compound selected from the group consisting of compounds having the formula $$(R_3Sn)_2O$$

wherein each R is selected from the group consisting of acyclic alkyls containing from 5 to 7 carbon atoms, adducts of bis(trialkyltin)oxides wherein each alkyl contains from 5 to 7 carbon atoms with $CO_2$, $CS_2$, and $SO_2$, and mixtures thereof. In the conduct of the acaricidal method herein, the acarina are killed by direct contact with the organotin compound when it is applied to the plant, by direct contact with the organotin compound which remains as a residue on the plant, and by ingestion of the tissue of the plant which has been contacted by the organotin compound. The organotin compounds of the invention impart a residual acaricidal effect to the plant so that acarids which infest the plant even days or weeks after application of the compound are killed.

Representative bis(tri-acyclicalkyltin)oxides of the invention are: bis(tri-n-pentyltin)oxide, bis(tri-n-hexyltin)oxide, bis(tri-n-heptyltin)oxide, bis(tri-2-methylbutyltin)oxide, bis(tri-3-methylpentyltin)oixde, and bis(dihexylpentyltin)oxide. Preferred compounds are bis(tri-n-pentyltin)oxide, bis(tri-n-hexyltin)oxide, bis(tri-n-heptyltin)oxide. The most preferred compound is bis(tri-n-hexyltin)oxide.

Representative adducts of bis(trialkyltin)oxides and $CO_2$, $CS_2$ and $SO_2$ of the invention are the adduct of bis(tri-n-pentyltin)oxide with $CO_2$, bis(tri-n-hexyltin)oxide with $CO_2$, bis(tri-n-heptyltin)oxide with $CO_2$, bis(tri-2-methylbutyltin)oxide with $CO_2$, bis(tri-cyclohexyltin)oxide with $CO_2$, bis(tri-n-pentyltin)oxide with $CS_2$, bis(tri-n-hexyltin)oxide with $CS_2$, bis(tri-n-heptyltin)oxide with $CS_2$, bis(tri-2-methylbutyltin)oxide with $CS_2$, bis(tri-n-pentyltin)oxide with $SO_2$, bis(tri-n-hexyltin)oxide with $SO_2$, bis(tri-n-heptyltin)oxide with $SO_2$, bis(tri-2-methylbutyltin)oxide with $SO_2$. Preferred compounds are the adducts of bis(tri-n-pentyltin)oxide with $CO_2$, bis(tri-n-hexyltin)oxide with $CO_2$, and bis(tri-n-heptyltin)oxide with $CO_2$. The most preferred compound is the adduct of bis(tri-n-hexyltin)oxide with $CO_2$.

The bis(tri-acyclicalkyltin)oxides of the present invention are known compounds and can be prepared by means well known in the art. For example, one mole of tin tetrachloride can be reacted with 4 moles of the Grignard reagent RMgBr (R being the alkyl desired in the trialkyltin oxide). The resulting tetraalkyltin is then converted to the trialkyltin chloride by reacting it with $SnCl_4$. The trialkyltin chloride is then converted to the bis(tri-acyclicalkyltin)oxide by reacting it with sodium hydroxide. The procedure is more fully described in J. Appl. Chem., Vol. 6, February 1956, pp 49–55.

The adducts of the bis(trialkyltin)oxides of the present invention are known compounds and can be prepared by means well known in the art. For example, 1 mole of tri-n-hexyltin oxide can be reacted with 1 mole of carbon dioxide. This reaction is commonly performed by bubbling gasesous carbon dioxide through the organotin compound at 0° to 50°C at atmospheric pressure. An inert solvent such as n-heptane or xylene can be used to facilitate the reaction. If such an inert solvent is used, it is removed by distillation at the completion of the reaction should its removal be desired. The procedure is more fully described in U.S. Pat. No. 3,417,117.

The present invention can be used in combating acarina on all types of useful plants, including field crops such as soybeans, green beans, tomatoes, corn, peppers, strawberries, clover, alfalfa and cotton, orchard crops such as citrus, apples, pears, cherries, grapes and peaches and ornamentals such as evergreens, azaleas chrysanthemums, roses, carnations and gladiolas. The present invention is particularly advantageous for use on those plants such as soybeans, peaches and certain types of chrysanthemums and roses which are highly prone to give phytotoxic responses when treated with pesticides.

For use as acaricides, the organotin compounds of this invention are preferably incorporated into acaricidal compositions which comprise an inert carrier and one or more of the organotin compounds. (As used herein an inert carrier is defined as a solvent or a dry bulking agent which has substantially no acaricidal effectiveness but which provides a means whereby the organotin compounds can be diluted for convenient application.) Such acaricidal compositions enable the organotin compounds to be applied in a convenient and controlled manner to plants in any desired quantity. These compositions can be solids, such as dusts, or granules or wet-table powders, or they can be liquids such as solutions, aerosols, or emulsions. For application to plants, the compositions generally contain from about 50 to 60,000 ppm (parts per million) of the organotin compound depending on the amount of composition applied per acre. When using conventional dilute application techniques, the concentration of organotin compound in the composition will be generally in the range of about 50 to 3,000 ppm, preferably about 125 to 1,500 ppm. When using the Low Volume (LV) and Ultra Low Volume (ULV) application techniques which have gained wide acceptance in recent years, the concentration of organotin compound in the composition will generally be in the range of 1,200 to 36,000 ppm, preferably, from about 2400 to 30,000 ppm. Generally, whatever application technique is used, the amount of organotin compound applied should be of the order of about 0.1 to about 3.0 pounds, preferably about 0.2 to about 2.0 pounds per acre of crop, depending on type of crop, foliage density and the severity of the acarian infestation. For convenience in bulk handling, the compositions are generally formulated as concentrates which can be diluted to the desired usage level with water, solvent or other inert carrier just prior to use.

Dusts can be prepared by blending the organotin compounds with a solid inert carrier such as talcs, clays, silicas, pyrophylite and the like. Granular formulations can be prepared by impregnating the organotin compounds, usually dissolved in a suitable solvent, onto and into granulated carriers such as the attapulgites or the vermiculites, usually of a particle size range of from about 0.3 to 1.5 mm, or by coating a solid inert carrier with a wettable powder formulation of the compounds. Wettable powders, which can be dispersed in water or oil to any desired concentration of the organotin compounds, can be prepared by incorporating wetting agents into concentrated dust compositions.

The organotin compounds of the present invention are sufficiently soluble or dispersible in the common organic solvents such as kerosene, xylene, Stoddard Solvent, acetone, and the like, that they can be used directly as solutions or dispersions in these solvents. Frequently, these solutions or dispersions of acaricide are dispensed under super-atmospheric pressure as aerosols. Preferred liquid acaricidal compositions for the practice of the invention herein are emulsifiable concentrates which comprise the organotin compound, an emulsifier, and, as an inert carrier, a solvent. Such concentrates can be extended with water and/or oil to the desired concentration of organotin compound for application as sprays to the plants which are to be treated. The emulsifiers used in these concentrates are surface active agents of the anionic, nonionic, cationic, ampholytic or zwitterionic type and normally comprise from about 0.1% to 30% by weight of the concentrate. The emulsifiers can be used singly or in mixtures. Examples of suitable anionic surface active agents are alkali metal and alkaline earth metal (e.g., sodium and calcium) salts of fatty alcohol sulfates having from 8–18 carbon atoms in the fatty chain and the alkali metal and alkaline earth metal (e.g., sodium and calcium) salts of alkyl benzene sulfonates, having from 9 to 15 carbon atoms in the alkyl chain. Examples of suitable nonionic surface active agents are the polyethylene oxide condensates of fatty alcohols, wherein the fatty chain contains from about 8 to 22 carbon atoms and the amount of ethylene oxide condensed onto each mole of fatty alcohol is from about 5 to 25 moles. Examples of suitable cationic surface active agents are dimethyl dialkyl quaternary ammonium salts wherein the alkyl chains contain from about 8 to 18 carbon atoms and the salt forming anion is a halogen. Examples of suitable ampholytic surface active agents are derivatives of aliphatic secondary or tertiary amines in which one of the aliphatic substituents contains from about 8 to 18 carbon atoms and one contains an anionic water solubilizing group, e.g., sulfate or sulfonate or carboxylate. Specific suitable ampholytic surface active agents are sodium-3-dodecylamino propionate and sodium-3-dodecyl amino propane sulfonate. Examples of suitable zwitterionic surface active agents are derivatives of aliphatic quaternary ammonium compounds in which one of the aliphatic constituents contains from about 8 to 18 carbon atoms and one contains an anionic water solubilizing group. Specific examples of zwitterionic surface active agents are 3-(N,N-dimethyl-N-hexadecylammonio) propane-1-sulfonate and 3-(N,N-dimethyl-N-hexadecylammonio)-2-hydroxy propane-1-sulfonate. Many other suitable surface active agents are described in McCutcheon's Detergents and Emulsifiers — 1972 Ed., Allured Pub. Co. Ridgewood, N.J., which is incorporated by reference herein. Suitable solvents for these emulsifiable concentrates include hydrocarbons such as benzene, toluene, xylene, kerosene and Stoddard Solvent and halogenated hydrocarbons such as chlorobenzene, chloroform, fluorotrichloromethane and dichlorodifluoromethane. Solvents can be used singly or in mixtures.

The invention will be further illustrated by the following examples. In these examples, acaricidal and plant phytotoxicity test results were obtained according to the following procedures.

TEST PROCEDURE I

The plants used for testing were young (approximately 3–4 weeks old) soybean plants, having at least eight fully developed leaves per plant. The acarina organism used was the two-spotted mite, *Tetranychus urticae*.

Initial kill — A mite population of 25 mites is allowed to grow for 3 days on a three-leaf cluster on the test plants. At the end of 3 days each plant is sprayed with 15 cc of the acaricidal composition and a count of live adult and immature mites is made at periodic intervals after spraying.

Residual activity — The plants are sprayed with 15 cc per plant of the acaricidal composition. The next day a three leaf cluster on each soybean plant is infested with 10 mites. Counts of live adult and immature mites are made at periodic intervals.

Residual activity (washed) — This test is to measure residual activity under circumstances wherein the plant is exposed to water-washing (simulating rain or very high humidity) between the time of spraying and the time of mite infestation. The plants are sprayed with 15 cc per plant of the acaricidal composition. The next day each cluster of leaves which is going to be infested with mites is sprayed with 25 cc of water and allowed to dry. After drying, a three leaf cluster on each soybean plant is infested with 10 mites. Counts of live adult and immature mites are made at periodic intervals.

In each test, untreated control plants are grown adjacent to the test plants and infested with mites in the same manner.

EXAMPLE I

Emulsifiable concentrates were prepared having the following formula

| Toxicant | 189.25 g. |
|---|---|
| Calcium LAS* | 31.94 |
| TAE$_{11}$** | 31.94 |
| Xylene | 200.48 |

*The calcium salt of linear alkylbenzenesulfonate, the alkyl chain averaging $C_{12}$.

**The condensation product of 1 mole of tallow alcohol and 11 moles of ethylene oxide.

In one formula, called Formula A, the toxicant was bis(tri-n-butyltin)oxide and in the other, called Formula B, the toxicant was bis(tri-n-hexyltin)oxide. These compositions were diluted with water to usage level concentrations and tested for miticidal and phytotoxicity properties on soybean plants according to the test procedure described above. Results, which are shown in Tables I through IV, indicate that bis(tri-n-hexyltin)oxide has excellent initial residual acaricidal activity and low plant phytotoxicity, compared to bis(tri-n-butyltin)oxide.

TABLE I

INITIAL KILL
(number of live mites remaining)

| | Formula | Toxicant Concentration (ppm) | 0 | 1 | Days after toxicant application 2 | 11 | 18 |
|---|---|---|---|---|---|---|---|
| Expt. No. 1 | A(butyl) | 62.5 | 16a | 0 | 31i | 19i | leaves dropped |
| | B(hexyl) | 125 | 24a | 1a,1i | 16i | 0 | 0 |
| | Control* | — | 23a | 17a | 19a,30i | TNTC | TNTC |
| Expt. | A(butyl) | 125 | 30a | 0 | 0 | 20i | (leaves dropped) (17 day) |
| No. 2 | B(hexyl) | 250 | 17a | 0 | 0 | 0 | (0) (17 day) |
| | Control* | — | 24a | 23a | 17a | TNTC | (TNTC) (17 day) |

*Plants were infested with 25 mites but no test composition was applied
a = adult mites
i = immature mites
TNTC = too numerous to count

TABLE II

RESIDUAL ACTIVITY
(number of mites remaining)

| | Formula | Toxicant Concentration (ppm) | 0 | 1 | Days after toxicant application 10 | 17 | |
|---|---|---|---|---|---|---|---|
| Expt. No. 1 | A(butyl) | 62.5 | 10a | 7a | TNTC | leaves dropped | |
| | B(hexyl) | 125 | 10a | 4a | 16i | 21i | |
| | Control* | — | 10a | 7a | TNTC | TNTC | |
| Expt. No. 2 | A(butyl) | 125 | 10a | 8a | 65i | (leaves dropped) | (16 day) |
| | B(hexyl) | 250 | 10a | 2a | 0 | (0) | (16 day) |
| | Control* | — | 10a | 9a | 55a&i (combined) | (TNTC) | (16 day) |

*Plants were infested with 10 mites but no test composition was applied
a = adult mites
i = immature mites
TNTC = too numerous to count

TABLE III

RESIDUAL ACTIVITY - WASHED
(number of mites remaining)

| | Formula | Toxicant Concentration (ppm) | 0 | 1 | Days after toxicant application 10 | 17 | |
|---|---|---|---|---|---|---|---|
| Expt. No. 1 | A(butyl) | 62.5 | 10a | 3a | TNTC | leaves dropped | |
| | B(hexyl) | 125 | 10a | 10a | 100i | TNTC | |
| | Control* | — | 10a | 9a | TNTC | TNTC | |
| Expt. No. 2 | A(butyl) | 125 | 10a | 9a | 90i | (leaves dropped) | (16 day) |
| | B(hexyl) | 250 | 10a | 8a | 3i | (3a,4i) | (16 day) |
| | Control | — | 10a | 8a | 70a&i (combined) | (TNTC) | (16 day) |

*Plants were infected with 10 mites but no test composition was applied
a = adult mites
i = immature mites
TNTC = too numerous to count

TABLE IV

PHYTOTOXICITY GRADE
(based on average of 3 plants)

| | Formula | Toxicant Concentration (ppm) | 0 | 1 | Days after toxicant applied 2 | 11 | 18 | |
|---|---|---|---|---|---|---|---|---|
| Expt. No. 1 | A(butyl) | 62.5 | 0 | 4 | 4.5 | 5 | 5 | |
| | B(hexyl) | 125 | 0 | 1 | 0.5 | 0.5 | 1.5 | |
| | Control* | — | 0 | 0 | 0 | 0 | 0 | |
| Expt. No. 2 | A(butyl) | 125 | 0 | 3 | 4 | 5 | (5) | (17 day) |
| | B(hexyl) | 250 | 0 | 0.5 | 0.5 | 1–1.5 | (1.5) | (17 day) |
| | Control | — | 0 | 0 | 0 | 0 | (0) | (17 day) |

*No test composition applied

Phytotoxicity grades   0 ————————→ 5
                       No damage    Heavy
                                    damage -- plant/leaves essentially destroyed

EXAMPLE II

In Formula B of Example I the bis(tri-n-hexyltin)oxide is replaced by an equivalent weight of the following organotin compounds and substantially similar results are obtained in that mite control is substantially equal to or better than that obtained with Formula A, and the phytotoxicity is lower than that obtained with Formula A: bis(tri-n-pentyltin)oxide, bis(tri-n-heptyltin)oxide, bis(tri-2-methylbutyltin)oxide, bis(tri-3-methylpentyltin)oxide, bis(dihexylpentyltin)oxide, and the adducts of bis(tri-n-pentyltin)oxide with $CO_2$, bis(tri-n-hexyltin)oxide with $CO_2$, bis(tri-n-heptyltin)oxide with $CO_2$, bis(tri-2-methylbutyltin)oxide with $CO_2$, bis(tri-cyclohexyltin)oxide with $CO_2$, bis(tri-n-pentyltin)oxide with $CS_2$, bis(tri-n-hexyltin)oxide with $CS_2$, bis(tri-n-heptyltin)oxide with $CS_2$, bis(tri-2-methylbutyltin)oxide with $CS_2$, bis(tri-n-pentyltin)oxide with $SO_2$, bis(tri-n-hexyltin)oxide with $SO_2$, bis(tri-n-heptyltin)oxide with $SO_2$, bis(tri-2-methylbutyltin)oxide with $SO_2$.

A second series of tests were conducted to further illustrate this invention.

TEST PROCEDURE II

Lima bean plants are infested with 50 to 100 adults of the strawberry spider mite (*Tetranychus atlanticus*). Infested plants are dipped into solutions of the test material. Adult mortality is noted.

EXAMPLE III

Emulsifiable concentrates were prepared as in Example I. The toxicant in Formula B was bis(tri-n-hexyltin)oxide. The toxicant in Formula C was bis(tri-n-pentyltin)oxide. In Formula D the toxicant was bis(tri-n-heptyltin)oxide. The results of the tests with strawberry spider mites at the concentration noted are shown in Table V. These results show these materials to be effective acaracides. No substantial phytotoxicity was observed.

EXAMPLE IV

The formula of Example I was used with the test technique of Example III to demonstrate the efficacy of the $CO_2$ adduct of bis(tri-n-hexyltin)oxide. Table VI shows the effectiveness of the material against adult strawberry spider mites at the concentrations noted. In Formula B the toxicant is bis(tri-n-hexyltin)oxide. In Formula E the toxicant is the $CO_2$ adduct of bis(tri-n-hexyltin)oxide. These results indicate the bis(tri-n-hexyltin)oxide $CO_2$ adduct is an excellent acaricide. No substantial phytotoxicity was reported.

TABLE V

ADULT MORTALITY AFTER 5 DAYS
(based on average of 3 replications)

| Formula | 0.05% W/V* | % Mortality |
|---|---|---|
| C | | 100 |
| B | | 100 |
| D | | 92 |
| | 0.025% W/V | |
| C | | 100 |
| B | | 100 |
| D | | 11 |
| | 0.025% W/V | |
| C | | 100 |
| B | | 97 |
| D | | 0 |
| | 0.001% W/V | |
| C | | 81 |
| B | | 85 |
| D | | 0 |

*weight/volume

TABLE VI

ADULT MORTALITY

| Formula | 0.005% W/V | % Mortality |
|---|---|---|
| B | | 100 |
| E | | 100 |
| | 0.0005% W/V | |
| B | | 62 |
| E | | 100 |
| | 0.00005% W/V | |
| B | | <13 |
| E | | 32 |

What is claimed is:

1. A method of killing acarids comprising applying to plants which are infested by or which are subject to infestation by acarina with an acaricidally effective amount of bis(tri-n-hexyltin)oxide wherein said bis(tri-n-hexyltin)oxide is present at a concentration of about 50 to about 60,000 ppm. in a composition comprising an inert carrier, and wherein said composition is applied to said plants at a rate of from about 0.1 to about 3.0 pounds of said bis(tri-n-hexyltin)oxide per acre.

2. The method of claim 1 wherein said composition is applied to plants at a rate of from about 0.2 to about 2.0 pounds of bis(tri-n-hexyltin)oxide per acre.

* * * * *